United States Patent [19]
Thomas

[11] Patent Number: 5,854,731
[45] Date of Patent: Dec. 29, 1998

[54] ELECTRICAL APPARATUS

[75] Inventor: Kevin Paul Thomas, Gloucestershire, England

[73] Assignee: Smiths Industries Public Limited Company, London, England

[21] Appl. No.: 981,259
[22] PCT Filed: Jul. 10, 1996
[86] PCT No.: PCT/GB96/01645
§ 371 Date: Dec. 22, 1997
§ 102(e) Date: Dec. 22, 1997
[87] PCT Pub. No.: WO97/04511
PCT Pub. Date: Feb. 6, 1997

[30] Foreign Application Priority Data
Jul. 15, 1995 [GB] United Kingdom .................... 9514528
[51] Int. Cl.$^6$ ........................................................ H02H 5/00
[52] U.S. Cl. .............................. 361/93; 361/23; 361/103; 361/115
[58] Field of Search .................................. 361/18, 23, 24, 361/25, 93, 96, 100, 115, 103

[56] References Cited

U.S. PATENT DOCUMENTS 4,717,985  1/1988  Demeyer .................................... 361/96

*Primary Examiner*—Jeffrey Gaffin
*Assistant Examiner*—Stephen Jackson
*Attorney, Agent, or Firm*—Pollock, Vande Sande & Amernick

[57] ABSTRACT

An electrical system has a solid state switch controlled by a circuit emulating the thermal sensor of an electrothermal circuit breaker. A current sensor senses current flowing through the switch. In one arrangement, the current sensor supplies an output to a multiplier, which derives a voltage representative of a current squared, this being supplied to a resistor capacitor circuit having a time constant emulating the thermal sensor. In another arrangement, the output of the current sensor is supplied via an A/D converter to a processor that calculates the difference between heat gain and heat loss of the emulated thermal sensor. The switch is opened when the emulated temperature exceeds a threshold.

1 Claim, 1 Drawing Sheet

ELECTRICAL APPARATUS

This invention relates to electrical apparatus and methods for controlling switching of circuit protection devices.

BACKGROUND OF THE INVENTION

The usual way of protecting electrical equipment and its wiring from current overloads is by means of an electromagnetic relay switch, thermal wire fuse or an electrothermal circuit breaker. An electrothermal circuit breaker uses the current flowing through it to heat a thermal sensor. Typically this consists of a bimetallic strip thermostat heated by a resistive element, which passes the current flowing through the breaker. The thermostat will operate when its temperature is raised beyond a pre-set value, with the consequence that the circuit breaker will open, removing power from the load. The temperature of the thermostat at any one time is a function of the dynamic equilibrium between the heat gain from the resistive element and the heat loss to its surroundings. The resistive element will gain heat at the rate $I^2R$, where I is the current flowing through the resistive element and R is its resistance.

These previous arrangements, however, are usually relatively heavy and bulky. They also have a slow response time and can be unreliable in the long term. Because of this there is a move towards using solid state power controllers (SSPC) employing power semiconductors, to switch electrical energy to a load and to interrupt current flow should an overload be detected.

Conventional electromagnetic devices, however, have an advantage not enjoyed by SSPCs in that they have an $I^2t$ characteristic. That is, the product of the square of current I and the time to reach a critical energy level is a constant so that the time taken to trip out is inversely proportional to the square of the current. This means that the device will trip quickly for high currents but, for low currents, the trip time will be longer. Thus, a moderate excess current may not produce a trip if the current reduces after a short time. This reduces the occurrence of nuisance trips. Also, thermal protection devices have a memory in that a previous non-trip overload will raise the temperature of the device so that, if a second overload current should occur shortly after, it would raise the temperature of the device to its trip level more quickly. This is a useful feature, because the equipment and wiring protected by the device would respond in a similar way.

Various circuit breakers have been proposed previously in GB 2271895, GB 2140633, GB 899354, GB 1527962, GB 1524826, GB 2135146, GB 1124492, EP 5324, EP 326334 and U.S. Pat. No. 4,266,259.

It is an object of the present invention to provide improved apparatus for use in power switching and an improved method of controlling switching of a circuit protection device.

SUMMARY OF THE INVENTION

According to one aspect of the present invention there is provided electrical apparatus including a switchable circuit protection device, a current sensor that senses current flow through the circuit protection device, an emulator that receives an input from the current sensor and emulates the thermal sensor of an electrothermal circuit breaker, and means for supplying an output from the emulator to control switching of the circuit protection device.

The emulator may include a multiplier that multiplies the sensed current by itself to derive a voltage signal representative of current squared and a resistor capacitor circuit having a time constant that emulates the thermal sensor, the voltage signal being supplied to the resistor capacitor circuit and the output of the resistor capacitor circuit being connected to the circuit protection device.

Alternatively, the emulator may includes a processor connected to receive an output of the current sensor, the processor calculating the resultant heat gain of the emulated thermal sensor during a short period of time, the processor calculating the resultant heat loss of the emulated thermal sensor during the short period of time, the processor calculating the resultant temperature of the emulated sensor at the end of the period, and the processor switching the circuit protection device if the temperature exceeds a predetermined limit. The emulator preferably includes an analogue-to-digital converter that receives the output from the current sensor and provides a digital output to the processor.

The circuit protection device is preferably a solid state switch.

According to another aspect of the present invention there is provided a method of controlling switching of a circuit protection device comprising the steps of deriving a signal representative of heating of an emulated thermal sensor, deriving a signal representative of cooling of the thermal sensor, determining the temperature of the thermal sensor from the sum of its previous temperature and the difference between sensor heating and cooling, comparing the sensor temperature with a maximum permitted temperature, and signalling the circuit protection device to open if the maximum permitted temperature is exceeded.

According to a further aspect of the present invention there is provided a method of controlling switching of a circuit protection device comprising the steps of multiplying by itself a signal representative of current flow through the circuit protection device, calculating a difference value by subtracting from this squared value a value stored in an accumulator, multiplying the difference value by a constant, subtracting the product of the multiplication from the squared value, entering the resultant value in the accumulator, comparing the resultant accumulator value with a maximum threshold, and generating a trip command to the circuit protection device if the accumulator value exceeds the threshold.

BRIEF DESCRIPTION OF THE DRAWINGS

An electrical system including a circuit protection device and various apparatus and methods for controlling operation of the device, in accordance with the present invention, will now be described, by way of example, with reference to the accompanying drawings, in which.

DESCRIPTION OF THE PREFERRED EMBODIMENTS

Figure 1:
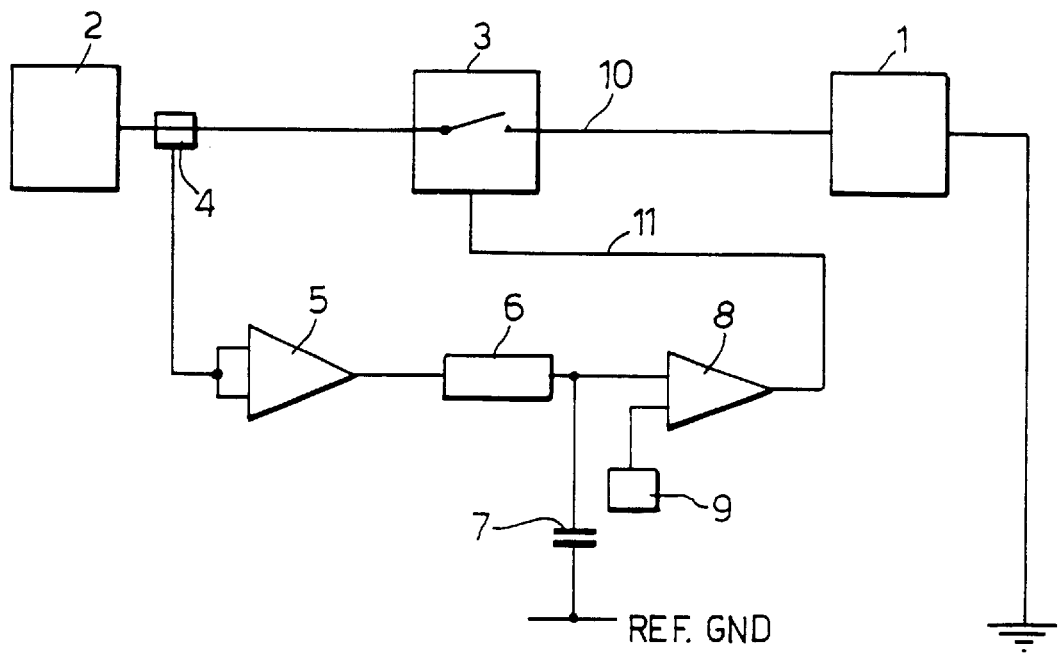
FIG. 1 is a schematic diagram of the system.

With reference to FIG. 1, there is shown an electrical system including an electrical circuit comprising electrical equipment 1 and associated wiring 10 connected to a power source 2 via a solid state power switch 3. A current sensing device 4 supplies a signal proportional to the current flowing through the power switch 3 to both inputs of a multiplier 5. The voltage output of the multiplier 5 is connected via a resistor 6 to a first plate of a capacitor 7, which has its second plate connected to a ground reference. The first plate of the capacitor 7 is also connected to one input of a comparator 8, the other input of which is connected to a source 9 of reference voltage. The output of the comparator 8 is connected via line 11 to the control input of the power controller 3.

The time constant of the RC network formed by the resistor 6 and capacitor 7 is selected to be the same as the desired thermal time constant of the thermal sensor of the equivalent electrothermal circuit breaker. The voltage $V_c$ across the capacitor 7 represents the actual temperature of the emulated thermal sensor in the circuit. This is compared with the reference voltage provided by the source 9 representing the maximum temperature the emulated thermal sensor is allowed to reach.

In normal operation, the current flowing through the equipment 1 and its associated wiring 10 is below the maximum continuous current rating, so the voltage $V_c$ across the capacitor 7 does not exceed the reference voltage and no trip will occur.

When overload conditions occur, the voltage $V_c$ across the capacitor 7 increases until its voltage is greater than that of the reference voltage. The comparator 8 generates an output control signal to the power switch 3, causing it to open and interrupt power supply to the equipment 1 and its associated wiring 10. The time interval between the occurrence of the overload and the generation of the trip command is, therefore, dependent on the magnitude of the overload.

The ability of the capacitor 7 to store charge gives the apparatus the equivalent of the thermal memory of a conventional thermal device. For example, if the circuit were subject to a current overload close to, but below, the trip limit for a period time, the capacitor 7 would be charged to a voltage level close to the reference voltage. When the overload is removed, the output of the multiplier 5 falls below the voltage of the capacitor, causing the capacitor to discharge through the resistor 6. This models the heating and cooling that takes place in the thermal sensor of a conventional electrothermal device. If a second overload occurred before the capacitor had discharged significantly, the charge time to reach the critical trip threshold would be shorter. This replicates the performance of the thermal sensor of a conventional thermal device, which would not have had time to cool fully before the second overload.

In an alternative arrangement, digital techniques could be used to make calculations to emulate the performance of a conventional electrothermal circuit breaker. The exact form of heat loss to the surroundings of a conventional electrothermal device is a complex function but good agreement with $I^2t$ curves from conventional circuit breakers has been obtained by assuming heat loss is directly proportional to the temperature difference between the thermal sensor and its surroundings. The emulation consists of a repetitive calculation of the heat loss and gain calculations, followed by comparison of the resultant temperature with a pre-set maximum. The repetition time is chosen to be sufficiently short to ensure that the power switch is actuated in a timely manner in the event of current overload and to ensure that the temperature rise during that time is sufficiently small that errors caused by assuming it to be constant are negligible.

Figure 2:
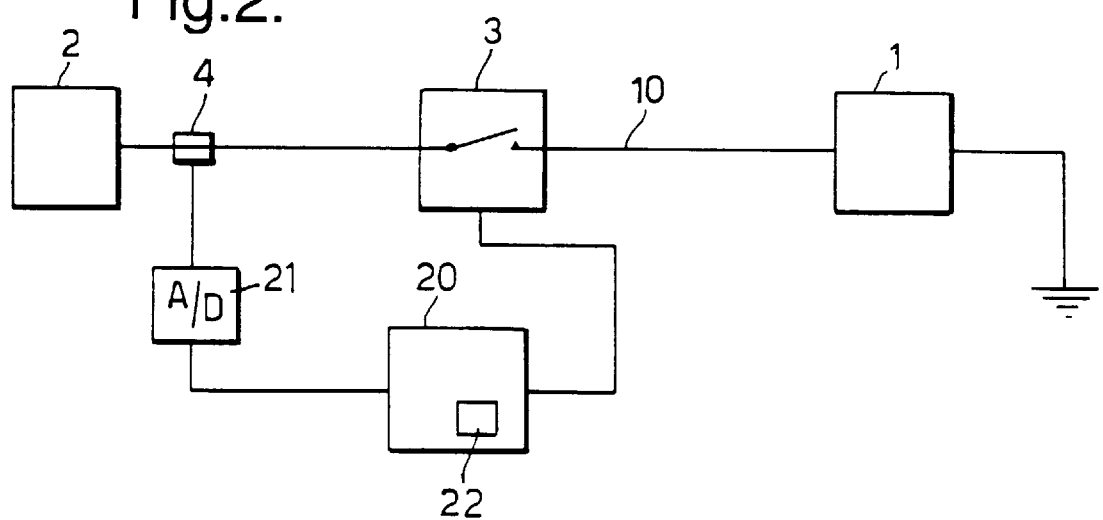
FIG. 2 is a schematic diagram of an alternative system.

With reference to FIG. 2, the components 5 to 9 of the previous arrangement are replaced by a processor 20 having its input connected to the current sensor 4 via an analogue-to-digital converter 21.

The processor 20 contains an accumulator 22 whose value emulates the temperature of the thermal sensor in the conventional electrothermal circuit breaker, relative to ambient. When the circuit is first powered, this accumulator is pre-set to an appropriate value. In many cases the appropriate value can be zero as the load and its wiring will all be at ambient temperature.

The output of the current sensing device 4 is converted to a convenient digital form by means of the analogue-to-digital converter 21 at an appropriate sampling rate. Each output sample of the analogue-to-digital converter 21 is used as a new data input to the processor 20, which carries out the following steps in turn for each new data value:

(1) Calculate the gross heat gain during the sampling repeat time to the emulated thermal sensor as a function of the data value from the analogue-to-digital converter 21. Then calculate a function consisting of the product of the data input value multiplied by itself and, if necessary, an appropriate scaling factor. Alternatively, the data input value could be raised to a power of some other non-unity constant. It may be convenient to use a look-up table to perform this calculation. This function is required to emulate a conventional circuit breaker but alternate functions can provide modified performance if required.

(2) Add the result of (1) into the accumulator 22 whose value represents the temperature of the emulated thermal sensor.

(3) Calculate the gross heat loss from the emulated thermal sensor, as a function of the value in the accumulator. A simple linear proportionality function has been found to emulate conventional circuit breaker characteristics but alternate functions may provide modified performance if desired. A look-up table may be used to perform this calculation.

(4) Subtract the result of (3) from the contents of the accumulator 22.

(5) Compare the resultant accumulator value with a maximum emulated threshold temperature.

(6) Generate a trip command if the accumulator value exceeds the threshold.

The processor 20 could be a microprocessor or microcontroller. Alternatively, the processor could be implemented by dedicated or programmed logic devices connected in a circuit.

Instead of performing the steps set out above, the processor 20 could perform the following steps for each new data value from the A/D converter 21:

(1) The data input value is multiplied by itself to produce a value representing the square of the input value. Alternatively, the data input value could be raised to a power of some other non-unity constant. A look-up table may be used to perform this calculation. This squared input value is then compared with the value stored in the accumulator.

(2) The following calculation is now performed:
Accumulator=squared input value−(squared input value−Accumulator)·C
where C represents a constant.

(3) Compare the resultant accumulator value with a maximum emulated threshold temperature.

(4) Generate a trip command if the accumulator value exceeds the threshold.

These techniques can generate a current input versus time-to-trip function similar to conventional electromagnetic circuit breakers with an $I^2t$ performance.

Although the above techniques can function satisfactorily, because they operate iteratively, the accuracy and continuous nature of its operation is dependent on the program execution time. Depending upon circumstances, it may be necessary to implement an additional control mechanism to the power supply switch to limit damage in the event of very high current flow.

Similarly, depending upon circumstances, it may be desirable to input information from other sensors or information sources via a suitable interface, which the processor will consider to modify its control to the power switching device. An example of this would be a temperature sensor, which could be used to modify the amount of power supplied to the load in the event that the temperature exceeded pre-set limits. An alternative example would be information from another controller.

It may also be desirable for the processor to be provided with a suitable interface to communicate information known to it, for example present current flow, to external systems for more comprehensive system control.

I claim:

1. A method of controlling switching of a circuit protection device comprising the steps of deriving a first signal by raising a signal representative of current flow through the circuit protection device by a non-unity constant to derive a gross heat gain value proportional to the current, calculating a difference value by subtracting from the value of this first signal a value stored in an accumulator to derive a gross heat value loss proportional to an emulated temperature of the device, multiplying the difference value by a constant, subtracting the product of the multiplication from the value of the first signal, entering the resultant value in the accumulator, comparing the resultant accumulator value with a maximum threshold, and generating a trip command to the circuit protection device if the accumulator value exceeds the threshold, whereby the trip command is generated in response to the simultaneous combined effect of heating and cooling of the device.

* * * * *